United States Patent [19]

Ohmori

[11] Patent Number: 4,634,074
[45] Date of Patent: Jan. 6, 1987

[54] SPINNING TYPE FISHING REEL WITH LINE UNTWISTING CAPABILITY

[75] Inventor: Hatsutaro Ohmori, Tokyo, Japan

[73] Assignee: Kabushiki Kaisha Ohmori Seisakusho, Japan

[21] Appl. No.: 712,234

[22] Filed: Mar. 15, 1985

[30] Foreign Application Priority Data

Nov. 22, 1984 [JP] Japan .................. 59-246332
Nov. 22, 1984 [JP] Japan .................. 59-246333

[51] Int. Cl.$^4$ ............................................ A01K 89/01
[52] U.S. Cl. ............................................ 242/84.21 R
[58] Field of Search .............. 242/84.1 R, 84.2 R, 242/84.2 A, 84.2 C, 84.2 D, 84.2 E, 84.2 F, 84.2 G, 84.21 R, 84.21 A

[56] References Cited

U.S. PATENT DOCUMENTS

| 2,229,470 | 1/1941 | Pezon | 242/84.21 R |
| 2,891,738 | 6/1959 | Chapin | 242/84.21 R |
| 3,004,731 | 10/1961 | Mauborgne | 242/84.1 R |
| 3,552,675 | 1/1971 | Morritt | 242/84.21 A |

FOREIGN PATENT DOCUMENTS 557852  5/1958  Canada .................. 242/84.21 R

Primary Examiner—Billy S. Taylor
Attorney, Agent, or Firm—Michael D. McCully

[57] ABSTRACT

This spinning type fishing reel includes a spool for carrying a coil of fishing line, a rotor which can be rotated in a forwards rotational direction for winding fishing line onto the spool, and a means for rotationally coupling the rotor to the spool, when the rotor is rotating in the reverse rotational direction to the forward rotational direction, so as in this case also to rotate the spool in the reverse rotational direction. Thereby, when the rotor and the spool are thus rotated in the reverse rotational direction, twisting which may have taken place in the fishing line may be cancelled by untwisting the fishing line again. The coupling means may be actuatable according to the desire of the fisherman, or alternatively may be always in operation. A braking means may be provided for braking this reverse rotation. And, in the event that the spinning type fishing reel includes a drag device for braking the rotation of the spool, this drag device may be rotationally uncoupled from the spool, when the spool and the rotor are thus being rotated together in the reverse rotational direction.

8 Claims, 15 Drawing Figures

SPINNING TYPE FISHING REEL WITH LINE UNTWISTING CAPABILITY

BACKGROUND OF THE INVENTION

The present invention relates to the field of spinning type fishing reels, and more particularly relates to a spinning type fishing reel with a provision for untwisting the fishing line if it should have become twisted.

In the use of a spinning type fishing reel of the conventional type, when casting the fishing line, a certain amount of twisting is imparted to the line as it comes off the spool in a coil. Now, when the line is rewound onto the spool, some of this twisting is cancelled, but typically some remains. Further, in the case of a spinning type fishing reel equipped with a per se known type of drag device which allows the spool on which the line is wound to be rotated to unwind further fishing line, when a fisherman rotates the handle of the fishing reel while a fish pulls on the fishing line with a pulling force greater than a critical pulling force, to rotate the spool so as to unwind the fishing line, the fishing line becomes further twisted since the rotor gets rotated without the line being wound up onto the spool. This sort of twisting of the fishing line can cause the line to become coiled or tangled around the spinning type fishing reel while casting, or can cause a lure attached to the end of the fishing line to turn in an undesirable fashion. However, in the conventional art such twisting of the fishing line is an inevitable consequence of the construction of the spinning type fishing reel.

SUMMARY OF THE INVENTION

Accordingly, it is the primary object of the present invention to provide a spinning type fishing reel, which avoids the above identified problems.

It is a further object of the present invention to provide such a spinning type fishing reel, which has a capability for untwisting the fishing line when it has become twisted.

It is a yet further object of the present invention to provide such a spinning type fishing reel, which can ensure that the fishing line does not become coiled or tangled on the spinning type fishing reel.

It is a yet further object of the present invention to provide such a spinning type fishing reel, which ensures that a lure attached to the end of the fishing line is not rotated to an undesirable extent.

It is a yet further object of the present invention to provide such a spinning type fishing reel, which ensures that a drag device provided for said spinning type fishing reel will not unduly hinder the aforesaid unwinding action of the fishing line.

According to the present invention, these and other objects are accomplished by a spinning type fishing reel, comprising: a spool for carrying a coil of fishing line; a rotor which can be rotated in a forwards rotational direction of winding fishing line onto said spool; and a means for rotationally coupling said rotor to said spool, when said rotor is rotating in the reverse rotational direction to said forward rotational direction, so as in this case also to rotate said spool to said reverse rotational direction.

According to such a structure, when twisting of the fishing line has occurred, and it is desired to cancel such twisting, then the means for rotationally coupling the rotor to the spool is actuated (if this step in fact is required) and both the rotor and the spool are rotated in the reverse rotational direction, thus unwinding the fishing line.

Further, if the spinning type fishing reel also comprises a drag means for preventing rotational movement of said spool, when a turning force of less than a determinate value is applied to said spool, then according to a particular aspect of the present invention the spinning type fishing reel may also further comprise a means for selectively rotationally coupling said spool to said drag means, when and only when said spool is rotating in said forward rotational direction.

According to this particular feature of the present invention, the drag means is prevented from substantially interfering with the aforementioned reverse rotation of the spool and the rotor together to cancel the twisting of the fishing line. This coupling means may be a ratchet device.

Further, according to another particular feature of the present invention, the spinning type fishing reel may further comprise a means for, when said spool and said rotor are thus rotating together in said reverse rotational direction, braking their rotation.

According to such a structure, the untwisting of the fishing line may be appropriately regulated.

BRIEF DESCRIPTION OF THE DRAWINGS

The present invention will now be described in terms of several preferred embodiments thereof, and with reference to the appended drawings. However, it should be understood that the description of the embodiments, and the drawings, are not any of them intended to be limitative of the scope of the present invention, since this scope is to be understood as to be defined by the appended claims, in their legitimate and proper interpretation. In the drawings, like reference symbols denote like parts and dimensions and so on in the separate figures thereof; spatial terms are to be understood as referring either to the orientation on the drawing paper of the relevant figure or to the position in which the fisherman holds the spinning type fishing reel; and:

DESCRIPTION OF THE PREFERRED EMBODIMENTS

The present invention will now be described in detail with respect to several preferred embodiments thereof, and with reference to the drawings. FIGS. 1 through 7 show the first preferred embodiment of the spinning type fishing reel according to the present invention, which is a so called rear drag spinning type fishing reel in which the drag device is provided at its rear portion.

Figure 3:
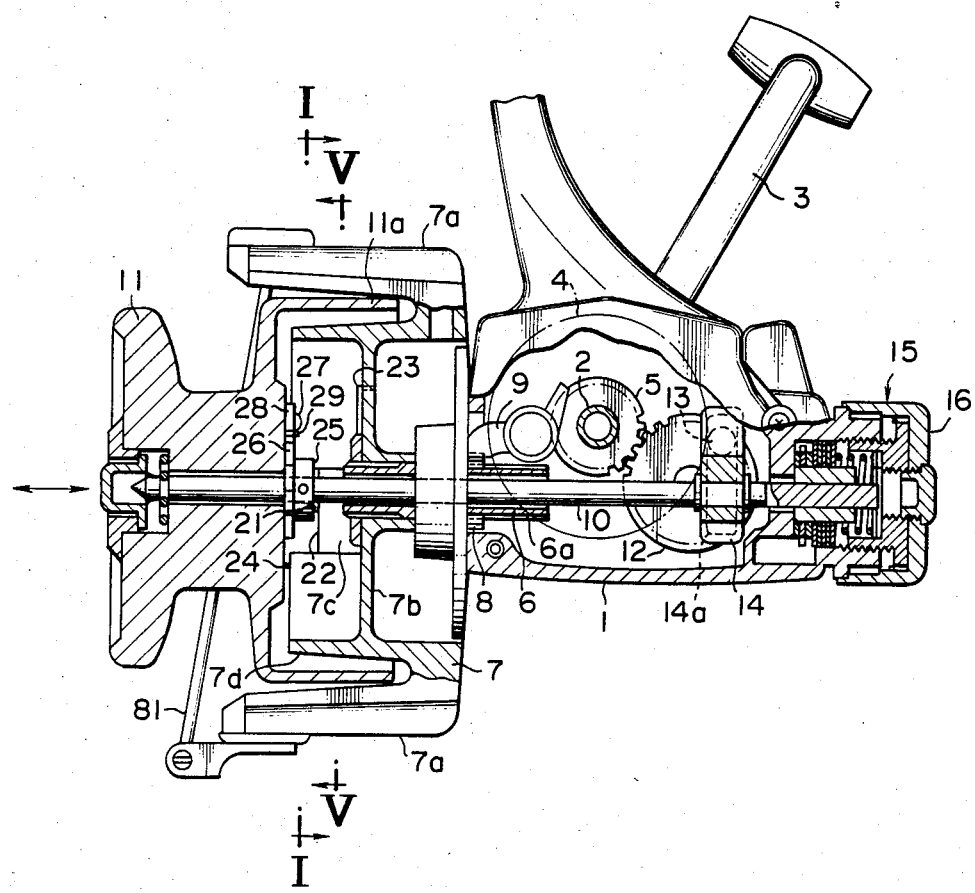
FIG. 3 is an overall sectional view taken through said first preferred embodiment of the spinning type fishing reel of the present invention in a vertical plane including its longitudinal axis.

Referring to FIG. 3, which is a sectional view taken through said first preferred embodiment in a vertical plane including its longitudinal axis, this spinning type fishing reel has a body 1 in which a handle shaft 2 is rotatably mounted, and on one end of this handle shaft 2 there is fixedly mounted a handle 3, to provide for manual rotation of said handle shaft 2 by the hand of the fisherman. On the handle shaft 2 there are fixedly mounted a contrate gear 4 and a spur gear 5. Within the body 1 there is rotatably supported (so as however to be axially fixed) a hollow rotor shaft 6 which extends skew perpendicular to the handle shaft 2, and on the front end of this rotor shaft 6 (from the point of view of a fisherman holding the spinning type fishing reel, whose body is located on the right of the body 1 of the spinning type fishing reel from the point of view of FIG. 3) there is fixedly mounted a rotor 7, which has a hub portion fixed to the rotor shaft 6, a disk portion 7b whose inner portion is fixed to said hub portion and which extends in a plane perpendicular to said rotor shaft 6, a hollow cylindrical portion 7d fixed to the outer portion of said disk portion 7b, and two arm portions 7a extending radially outwards and then axially forwards from said hollow cylindrical portion 7d. On the ends of these arm portions there is mounted a bail member or pickup 81 for guiding the fishing line in a per se conventional fashion, so as to be rotatably about a line perpendicularly intersecting the axis of rotation of the rotor shaft 6.

On the rear end of the rotor shaft 6 there is fixedly integrally mounted a pinion 6a which meshes with the contrate gear 4. Further, a ratchet gear 8 is fixedly mounted to the rotor shaft 6, and a ratchet pawl 9 is rotatably supported by the body 1 of the spinning type fishing reel and is urged to engage this ratchet gear 8 by a biasing means such as a spring, not shown. When this ratchet pawl 9 is allowed thus to be biased to engage with the ratchet gear 8, then the ratchet gear 8 is able to turn in the forwards direction by clicking past the ratchet pawl 9 with its teeth successively pushing said ratchet pawl 9 away from said ratchet gear 8 but is not able to turn in the reverse direction because one or the other of its teeth jams against said ratchet pawl 9, and accordingly the rotor shaft 6 and the rotor 7 can only rotate in the forwards rotational direction and are prevented from rotating in the backwards rotational direction; but a means, not shown, is provided for selectively displacing the ratchet pawl 9 away from the ratchet gear 8, and when said means (or so called reverse lock override device) is activated the engagement of the ratchet pawl 9 with the ratchet gear 8 is positively prevented, and accordingly the rotor shaft 6 and the rotor 7 can rotate in either rotational direction.

Through the central axial hole of the rotor shaft 6 passes a spool shaft 10, and this spool shaft 10 both is axially reciprocable and also is rotatable with respect both to the body 1 of the spinning type fishing reel and also to the rotor shaft 6. And on the left hand end in FIG. 3 of the spool shaft 10, i.e. on the forward end thereof, there is mounted a spool 11 rotatably but fixedly with regard to the axial direction; this mounting of the spool 11 on the spool shaft 10 may be a fixed mounting, or-as described in U.S. Pat. No. 4,535,953, the applicant of which was the same entity as the assignee of the present patent application, and which it is not intended hereby to admit as prior art to the present patent application except as otherwise required by law—the spool 11 may be mounted on the end of the spool shaft 10 so as normally to be fixed thereon with regard to the axial direction but so as also selectively to be adjustable thereon with regard to its axial position. The spool 11 has a rearwardly projecting cylindrical portion 11a which surrounds and closely opposes the hollow cylindrical portion 7d of the rotor 7.

A spur gear 12 is rotatably mounted to the body 1 of the spinning type fishing reel, and is meshed with the spur gear 5 on the handle shaft 2 so as to be turned thereby. On the side of the spur gear 12 is fixed a projecting eccentric pin 13. This eccentric pin 13 is inserted into a slot 14a formed in a guide member 14; the guide member 14 is mounted on the spool shaft 10 in such a manner that said spool shaft 10 cannot move axially with respect to said guide member 14 but can freely rotate with respect to said guide member 14. Further, the rotation of the spool shaft 10 with respect to the body 1 of the spinning type fishing reel is limited by a per se known type of drag device 15, which has an adjustment knob 16: this drag device 15 prevents the spool shaft 10 from turning with respect to the body 1, i.e. fixes these elements together with regard to mutual rotation (only), when the torque applied between them is less than a certain threshold torque value; but, on the other hand, when the torque between the spool shaft 10 and the body 1 of the spinning type fishing reel is greater than said certain threshold torque value, then said drag device 15 allows the spool shaft 10 to rotate with respect to the body 1. And the value of this certain threshold torque value is regulated by the adjustment knob 16.

Thus, as the handle 3 and the handle shaft 2 are rotated by the hand of the fisherman as he winds the spinning type fishing reel, the contrate gear 4 drives the gear 6a formed on the rotor shaft 6 and causes the rotor 7 to be rotated, thus winding the fishing line onto the spool 11, while at the same time the spur gear 5 rotates the spur gear 12, thus via the above explained crank mechanism including the eccentric pin 13 and the guide member 14 causing the spool shaft 10 to be reciprocated along its axial direction (but not to be rotated, assuming that the torque applied to said spool shaft 10 with respect to the body 1 is less than said threshold torque value), so as to cause the fishing line to be evenly and accurately wound on the spool 11.

The parts of the construction of the first preferred embodiment detailed up to this point have been per se conventional, except that the spool 11 is rotatable with respect to the spool shaft 10. Now, with reference to FIGS. 1 through 7, the particular features of this spinning type fishing reel which embody the concept of the present invention will be explained.

Figure 1:
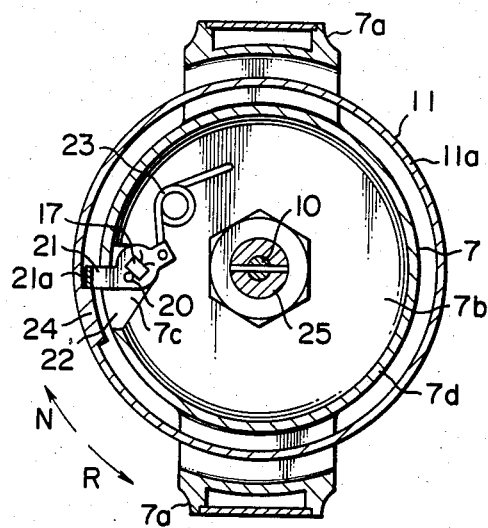
FIG. 1 is a sectional view through a spool and a rotor of a spinning type fishing reel which is a first preferred embodiment of the spinning type fishing reel of the present invention, taken in a plane shown in FIG. 3 by the arrows I—I and looking towards the rear of the spinning type fishing reel, and showing a spool reverse claw in its position as projecting outwards through a gap formed in the outer surface of said rotor.
Figure 2:
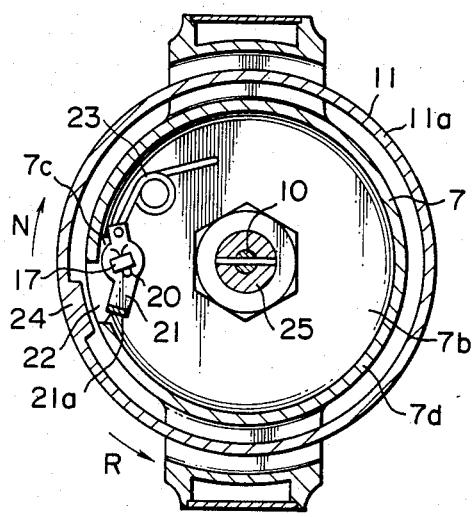
FIG. 2 is another sectional view through the spool and rotor of the spinning type fishing reel of FIG. 1, taken in the same sectional plane as FIG. 1 and looking in the same direction, and showing said spool reverse claw in its withdrawn position in which it does not project through said gap.
Figure 4:
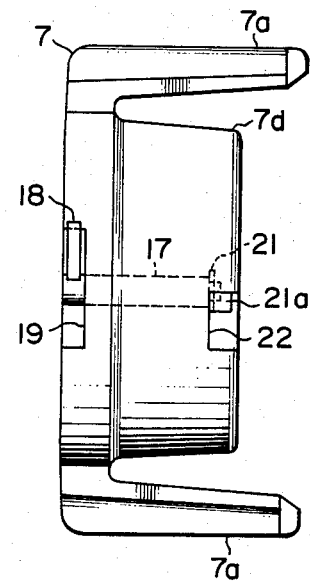
FIG. 4 is a side view of said rotor of said spinning type fishing reel.

Referring to FIGS. 1, 2, and 3, from an outer portion of the disk shaped portion 7b of the rotor 7 there extends towards the front of the spinning type fishing reel a mounting projection or platform 7c, and, as best shown in FIG. 4 which is a side view of said rotor 7, through this mounting platform 7c and through the body of the rotor 7 there is rotatably fitted a twist remover switchover pin 17, which extends parallel to the central axis of the rotor 7 and of the spool shaft 10. On the front end of this switchover pin 17 there is fixedly mounted, by a split pin 20, a spool reverse claw 21, the end 21a of which is angled towards the front of the spinning type fishing reel; and on the rear end of the switchover pin 17 there is fixedly mounted a twist remover switchover control lever 18, which projects sideways from the side of the rotor 7 at its rear portion through a slot 19 formed in its previously mentioned cylindrical portion 7d, as best seen in FIG. 4 and in FIG. 7 which is a rear end view of said rotor 7.

Figure 7:
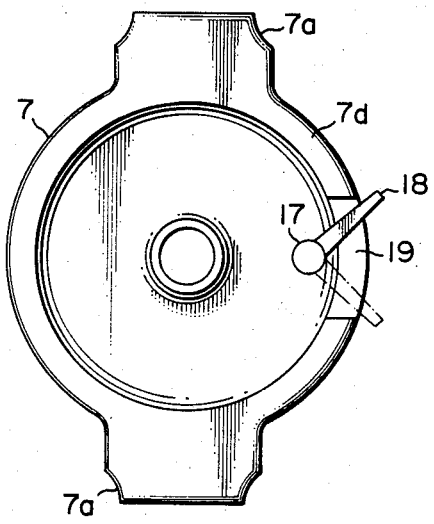
FIG. 7 is a rear end on view of said rotor of said spinning type fishing reel.

Thus, when the fisherman rotates this switchover control lever 18 by hand to its position shown in FIG. 7 by phantom lines, i.e. in the clockwise direction as seen in FIG. 7, then the spool reverse claw 21 is rotated in the anticlockwise direction from the point of view of FIGS. 1 and 2, so as to be brought to its position as seen in FIG. 2 in which its end 21a does not project through a gap 22 formed through the cylindrical portion 7d of the rotor 7; but, on the other hand, when the fisherman rotates the switchover control lever 18 by hand to its position shown in FIG. 7 by solid lines, i.e. in the anticlockwise direction as seen in FIG. 7, then the spool reverse claw 21 is rotated in the clockwise direction from the point of view of FIGS. 1 and 2, so as to be brought to its position as seen in FIG. 1 in which its end 21a projects outwards through said gap 22 formed through the cylindrical portion 7d of the rotor 7. And a torsion coil spring 23 with extended engaging end portions is provided as fitted between a projecting portion of the spool reverse claw 21 and the rotor 7, so as to provide an over center biasing action or a snap action to said spool reverse claw 21, i.e. so as, when the claw 21 is in its clockwise displaced position as shown in FIG. 1, to bias it still further in the clockwise direction so as to positively hold said claw 21 in said FIG. 1 position, and so as also, when the claw 21 is in its anticlockwise displaced position as shown in FIG. 2, to bias it still further in the anticlockwise direction so as to positively hold said claw 21 in said FIG. 2 position. And further on the inner surface of the aforementioned rearwardly projecting cylindrical portion 11a of the spool 11 there is formed a rib like projection 24, which extends longitudinally parallel to the central axis of the spool shaft 10, and which is adapted to be engaged as shown in FIG. 1 with the end 21a of the claw 21, when said claw 21 is as explained above set to its FIG. 1 position as projecting outwards through said gap 22 through the cylindrical portion 7d of the rotor 7.

Figure 5:
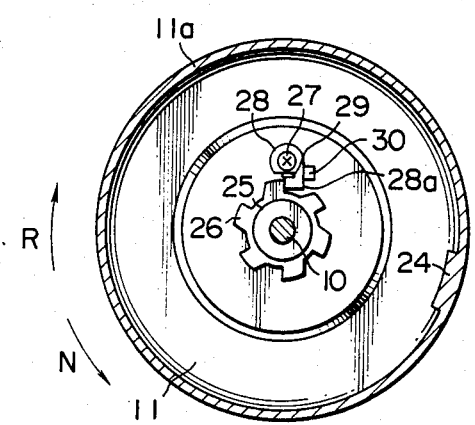
FIG. 5 is a sectional view through said spool and said rotor of said first preferred embodiment of the spinning type fishing reel of the present invention, taken in a plane shown in FIG. 3 by the arrows V—V and looking towards the front of the spinning type fishing reel at the rear end surface of the main body of said spool to show a ratchet mechanism in detail.
Figure 6:
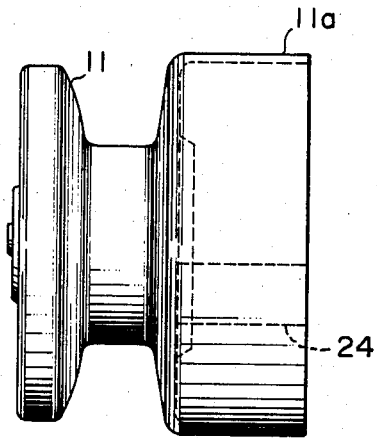
FIG. 6 is a side view of said spool of said spinning type fishing reel, showing certain internal constructional features thereof by broken lines.

Further, the spool 11 is coupled to the spool shaft 10 by a ratchet mechanism which will now be described. On the spool shaft 10 there is fixedly mounted a collar 25 opposing the rear end surface of the spool 11, and between these members is sandwiched a ratchet gear 26 which is also fixedly mounted on the spool shaft 10. As best seen in FIG. 5, which is a rear end on view of the spool 11 and the ratchet gear 26, on a pin 27 fixedly mounted in the rear end surface of the spool 11 is rotatably mounted a ratchet claw 28 which is biased by a torsion coil spring 29 anticlockwise in FIG. 5 to engage its projecting claw portion 28a against a stop member 30 also fixedly mounted on said rear surface of said spool 11. In this position, if it is attempted to rotate the ratchet wheel 26 in the clockwise direction with respect to the spool 11, one or the other of the teeth of the ratchet wheel 26 sandwiches said claw portion 28a between itself and said stop member 30, and this prevents the ratchet wheel 26 from further thus turning in the clockwise direction with respect to the spool 11; but, on the other hand, if it is attempted to rotate the ratchet wheel 26 in the anticlockwise direction with respect to the spool 11, each of the teeth of the ratchet wheel 26 in turn pushes the claw portion 28a and the claw 28 as a whole in the clockwise direction against the biasing action of the torsion spring 29 and is able to thus pass said claw portion 28a. Accordingly, with referece to FIG. 5, considering the ratchet action as a whole, the spool 11 cannot move with respect to the spool shaft 10 in the anticlockwise direction, but can move in the clockwise direction.

Now, this spinning type fishing reel according to the first preferred embodiment of the present invention described above operates as follows, with regard to removing the twisting of the fishing line.

When the fishing line (not shown) is unwound from the spool 11, then in order to untwist the line the fisherman turns the switchover control lever 18 by hand to its position as shown in FIG. 7 by the solid lines, so that the spool reverse claw 21 is rotated in the clockwise direction from the point of view of FIGS. 1 and 2 so as to be brought to its position as seen in FIG. 1 in which its end 21a projects outwards through the gap 22 formed through the cylindrical portion 7d of the rotor 7. Then the fisherman turns the handle 3 and the handle shaft 2 in the reverse rotational direction to that which is normally used to wind up the fishing line, and thus the rotor 7 is turned in the reverse direction to the winding direction, as indicated by the arrow "R" in FIG. 1. Very soon, the relative position of the spool 11 and the rotor 7 comes to be as shown in FIG. 1, where the rib projection 24 abuts against the end 21a of the spool reverse claw 21 and pinches said end 21a between itself and the side of the gap 22 in the cylindrical portion 7d of the rotor 7, and this prevents any further movement of the rotor 7, etc., in the direction as indicated by the arrow "R" with respect to the spool 11. Thereafter, therefore, the spool 11 is forced to rotate in the reverse direction "R" along with the rotor 7; however, it should be noted that in this state the spool 11 and the rotor 7 do not rotate as one body, because the spool 11 is being axially reciprocated while the rotor 7 is not, so that the rib projection 24 is reciprocatingly slid to and fro against the end 21a of the claw 21. However, this mutual sliding will not be liable to cause any particular problem.

And if the reverse rotation of the spool 11 and the rotor 7 is maintained for an appropriate time period, any twisting of the line which may previously have occurred can be canceled in a simple and satisfactory manner.

Now, during this reverse rotation of the spool 11, if it were necessary to overcome the resistance of the drag device 15 in order to thus rotate the spool 11, it would be quite impracticable to perform such reverse rotation; and, if it were necessary as an expedient to adjust the adjustment knob 16 in order to cause the drag device 15 to provide little or no drag during such a reverse rotation process, this would be quite troublesome for the user of the spinning type fishing reel. However, according to the shown preferred embodiment of the present invention, while as described above the spool 11 and the rotor 7 are being turned together in the reverse rotational direction, the spool 11 and the drag device 15 are disconnected from one another, because of the operation of the ratchet device of FIG. 5: the spool 11 is rotating in the direction indicated in FIG. 5 by the arrow "R" with respect to the spool shaft 10 and the ratchet wheel 26, and each of the teeth of the ratchet wheel 26 is in turn pushing the claw portion 28a and the claw 28 as a whole in the clockwise direction against the biasing action of the torsion spring 29 and is thus passing said claw portion 28a with a clicking action. Accordingly the spool 11 and the spool shaft 10 are not rotationally connected at this time, and a fortiori the spool 11 and the drag device 15 are therefore not rotationally connected.

On the other hand, during the normal operation of the fishing reel with the end 21a of the claw 21 retracted and not projecting through the gap 22 in the cylindrical portion 7d of the rotor 7, if a fish bites on the lure or the bait on the end of the fishing line and pulls on the line, then this pull attempts to rotate the spool 11 in the normal direction, i.e. the direction indicated in FIG. 5 by the arrow "N" with respect to the spool shaft 10 and the ratchet wheel 26, and in this condition, as explained above, one or the other of the teeth of the ratchet wheel 26 sandwiches the claw portion 28a of the ratchet claw 28 between itself and the stop member 30, thus preventing the spool 11 from further substantially turning in such a normal direction with respect to the ratchet wheel 26 and the spool shaft 10. Accordingly, the braking action of the drag device 15 is available in the per se known way.

However, it should be understood that the provision of this mechanism for disconnecting the spool from the drag device, when the spool is to be rotated in the reverse rotational direction for untwisting of the fishing line, is not essential to the present invention, although it is preferred.

After the operation of removal of twisting of the fishing line, as described above, when the fisherman desires to rewind the fishing line back onto the spool 11, then he need not even in fact turn the switchover control lever 18 by hand to its position as shown in FIG. 7 by the phantom lines in order to rotate the spool reverse claw 21 in the anticlockwise direction from the point of view of FIGS. 1 and 2 so as to bring it to its position as seen in FIG. 2 in which its end 21a no longer projects outwards through the gap 22 formed through the cylindrical portion 7d of the rotor 7, because it is merely necessary for said fisherman to turn the handle 3 and the handle shaft 2 in the normal rotational direction, so as to cause the rotor 7 to rotate in the normal rotational direction "N" as seen in FIG. 1 with respect to the spool 11 and the rib projection 24 formed thereon, and when this rotation has proceeded for approximately one full revolution then the rib projection 24 will come into contact with the upper side in FIG. 1 of the end 21a of the spool reverse claw 21 and will push said claw 21 and of course the switchover control shaft 17 and the lever 18 coupled thereto in the anticlockwise direction in FIG. 1 over past the neutral position provided by the spring 23 so that said claw 21 and shaft 17 and lever 18 snap to their positions as shown in FIG. 2 and as shown in FIG. 7 by the phantom lines, in which the end 21a of the claw 21 is retracted and does not project through the gap 22 in the cylindrical portion 7d of the rotor 7 and thus cannot interfere with the rib projection 24 on the spool 11. Then the fisherman continues to turn the handle 3 and the handle shaft 2 in the normal rotational direction, and thus the rotor 7 is continued to be turned in the winding direction, as indicated by the arrow "N" in FIG. 1, without turning the spool 11, so that only the rotor 7 and the bail 81 mounted thereon are rotated, as is per se conventional for winding up the fishing line.

According to the shown construction, if at any time during normal operation of the spinning type fishing reel it is required to rotate only the rotot 7 in the reverse rotational direction without rotating the spool 11 in said reverse rotational direction, with the end 21a of the claw 21 retracted and not projecting through the gap 22 in the cylindrical portion 7d of the rotor 7 and thus not able to interfere with the rib projection 24 on the spool 11, then it is only necessary for the fisherman to turn the handle 3 and the handle shaft 2 in the reverse rotational direction, and this will cause the rotor 7 to rotate in the reverse direction, but, since the rib projection 24 will not interfere with the claw 21 which is retracted, the spool 11 will not be rotated.

Figure 8:
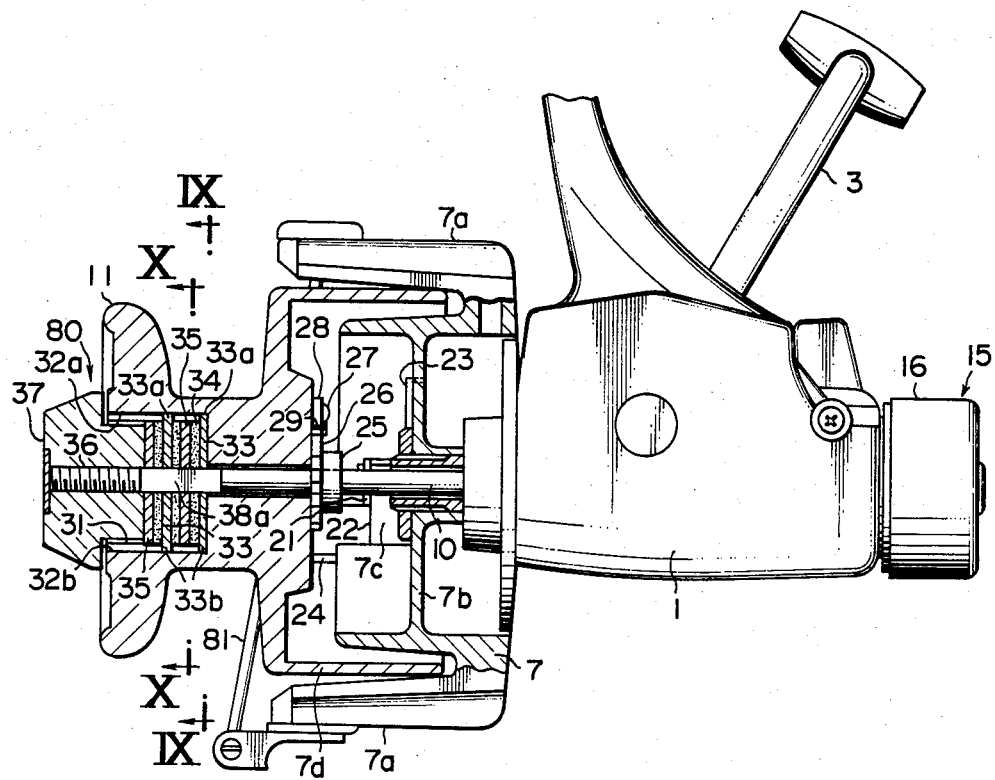
FIG. 8 is similar to FIG. 3, and is an overall sectional view taken through a second preferred embodiment of the spinning type fishing reel of the present invention, again taken in a vertical plane including its longitudinal axis.
Figure 9:
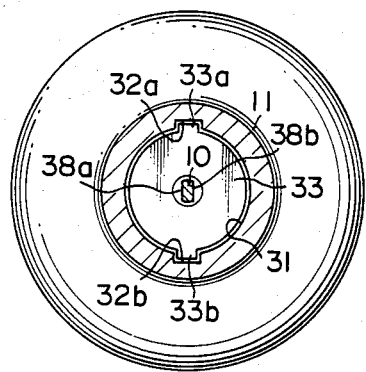
FIG. 9 is a sectional view through the spool of said second preferred embodiment, taken in a plane shown in FIG. 8 by the arrows IX—IX, with one of a set of spool side brake plates seen at the front of a superposed stack of brake plates.
Figure 10:
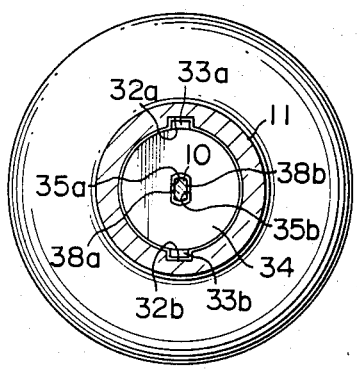
FIG. 10 is similar to FIG. 9, and is a sectional view through said spool of said second preferred embodiment, taken in a plane shown in FIG. 8 by the arrows X—X, with one of a set of shaft side brake plates seen at the front of a superposed stack of brake plates.

Now, in FIGS. 8, 9, and 10, there is shown the second preferred embodiment of the spinning type fishing reel according to the present invention, which again is a so called rear drag spinning type fishing reel in which the drag device is provided at its rear portion. In the first preferred embodiment of FIGS. 1 through 7, when the twisting of the fishing line was being relieved by the rotation together of the spool 11 and the rotor 7, no frictional resistance at all was presented to the rotation of the spool 11, by the action of the ratchet including the ratchet wheel 26; but in this second preferred embodiment, by contrast, a certain resistance is provided for this rearward rotation by a braking device 80, as well of course as the normal resistance provided by the drag device 15 to the rotation of the spool 11 during normal fishing procedure. Depending upon the type of fishing which is being performed, such untwisting resistance may be desirable in some cases.

Thus, referring to FIG. 8, which is a sectional view, similar to FIG. 3 relating to the first preferred embodiment, taken through the second preferred embodiment in a vertical plane including its longitudinal axis, the spool 11 was in the first preferred embodiment coupled to the spool shaft 10 only via the ratchet mechanism including the ratchet wheel 26, but in this second preferred embodiment the spool 11 is also frictionally coupled to the spool shaft 10 via a braking device 80.

In detail, the front end of the spool 11 is formed with a cylindrical hole 31 coaxial with the spool 11, and two grooves 32a and 32b are provided as extending longitudially along the inner surface of this cylindrical hole 31, i.e. parallel to the axis of the spool 11; this can be best seen in FIGS. 9 and 10, which are sectional front end on views of the spool 11. Also, the end of the spool shaft 10, over which the spool 11 is fitted, protrudes into and through the cylindrical hole 31, and is formed with a screw thread 36 on its very tip portion and with two flattened portions 38a and 38b on opposite sides of its portion contiguous to said tip portion which lies along the central axis of the hole 31. In the cylindrical hole 31 there are provided a number of spool side brake plates 33 and shaft side brake plates 35 in an sandwiched together alternating arrangement, and between each contiguous pair of these there is provided a friction plate 34. Each of the spool side brake plates 33 has a circular central hole for passage of the spool shaft 10 without rotational engagement thereto and a pair of projecting ears 33a and 33b extending from opposite sides of its outer circumference which are respectively engaged in the grooves 32a and 32b of the spool 11 so as to provide rotational engagement of said spool side brake plate 33 to said spool 11—see FIG. 9, which is a sectional view of the spinning type fishing reel taken in a plane shown in FIG. 8 by the arrows IX—IX and showing a view of the spool 11 with one of the spool side brake plates 33 at the front of the superposed stack of brake plates. And, similarly but oppositely, each of the shaft side brake plates 35 has a circular outer circumference for seating in the hole 31 of the spool 11 without rotational engagement thereto and a central hole for passage of the spool shaft 10 which is circular except for a pair of flats 35a and 35b on its opposite sides which are respectively engaged to the flattened portions 38a and 38b of the spool shaft 10 so as to provide rotational engagement of said shaft side brake plate 35 to said spool shaft 10—see FIG. 10, which is a sectional view of the spinning type fishing reel taken in a plane shown in FIG. 8 by the arrows X—X and showing a view of the spool 11 with one of the shaft side brake plates 35 at the front of the superposed stack of brake plates. And the friction plates 34, which are made out of a relatively soft and high friction material such as asbestos, and which are interposed between each neighboring pair of brake plates 33 and 35, are each formed with a circular central hole for passage of the spool shaft 10 without rotational engagement thereto and also with a circular outer circumference for seating in the hole 31 of the spool 11 without rotational engagement thereto. A reverse braking knob 37 is formed with a female screw thread which is engaged with the male screw thread 36 formed on the end of the spool shaft 10, so that, by selective adjustment of the amount of screwing of said reverse braking knob 37 on said spool shaft 10, the amount of compression pressure applied to the superposed sandwich stack of the brake plates 33 and 35 and the friction plates 34 may be varied at will.

Apart from the above described matters, the construction of this second preferred embodiment of the present invention is the same as that of the first preferred embodiment of FIGS. 1 through 7. In particular, the ratchet arrangement including the ratchet wheel 26 is the same as provided in the first preferred embodiment, and the locking arrangement including the claw 21 is also the same.

Again, in the operation of this second preferred embodiment, when it is desired to remove twisting of the fishing line, the rotor 7 and the spool 11 are rotated together in the reverse direction as described above, being rotationally linked by the arrangement including the claw 21, and at this time, since the ratchet device including the ratchet wheel 26 and the ratchet claw 28 does not lock up, the spool 11 is not thereby engaged to the spool shaft 10 via the above mentioned ratchet device to any substantial extent, and accordingly no braking effect is exerted by the drag device 15 on the above-mentioned reverse rotation of the spool 11 and the rotor 7. On the other hand, because of the mutual frictional effect between the spool side brake plates 33 which are rotationally engaged to and are therefore rotating together with the spool 11 and the rotor 7 and the shaft side brake plates 35 which are rotationally engaged to and are therefore rotationally fixed by the spool shaft 10 (since typically the frictional force of the drag device 15 is much stronger than the aforesaid mutual frictional effect), with the mediating effect of the friction plates 34, a certain braking effect is applied to the aforesaid reverse rotation of the spool 11 and the rotor 7, thus suitably controlling the untwisting of the fishing line. And the magnitude of this braking effect may be controlled by regulating the pressure exerted on the superposed sandwich of the brake plates 33 and 35 and the friction plates 34 by adjusting the knob 37.

Of course the braking exerted by the above described braking device 80 for reverse untwisting rotation is not applied during normal fishing operation of the spinning type fishing reel, because of the action of the ratchet device including the ratchet wheel 26 and the ratchet claw 28. And when the spool 11 is applied with torque to rotate it in the normal rotational direction, the ratchet mechanism including the ratchet wheel 26 and the ratchet claw 28 locks up to connect the spool 11 to the drag device 15 via the spool shaft 10; therefore the rotation of the spool 11 is braked by the drag device 15.

Consequently, in this preferred embodiment, when the spool 11 comes to be rotated in the normal rotational direction, the magnitude of the braking force applied to the spool 11 is determined by the drag device 15, but, when the spool 11 comes to be rotated in the reverse rotational direction, the above mentioned magnitude of the braking force is determined by the braking device 80.

Now, in FIGS. 11 through 15, there is shown the third preferred embodiment of the spinning type fishing reel according to the present invention, which in this case is a so called front drag spinning type fishing reel in which the drag device is provided at its front portion. FIGS. 4 and 7 are additionally referred to in conjunction with the description of this third preferred embodiment, in that the outward appearance of the rotor of the third preferred embodiment is identical to that of the first and second preferred embodiments. In this third preferred embodiment, again the rotor 7 is rotated in the body 1 and again the spool shaft 10' is axially reciprocated in said body 1 and passes through the center of the rotor 7, but, in contrast to the first and second embodiments, said spool shaft 10' cannot rotate in the body 1 at all.

Figure 11:
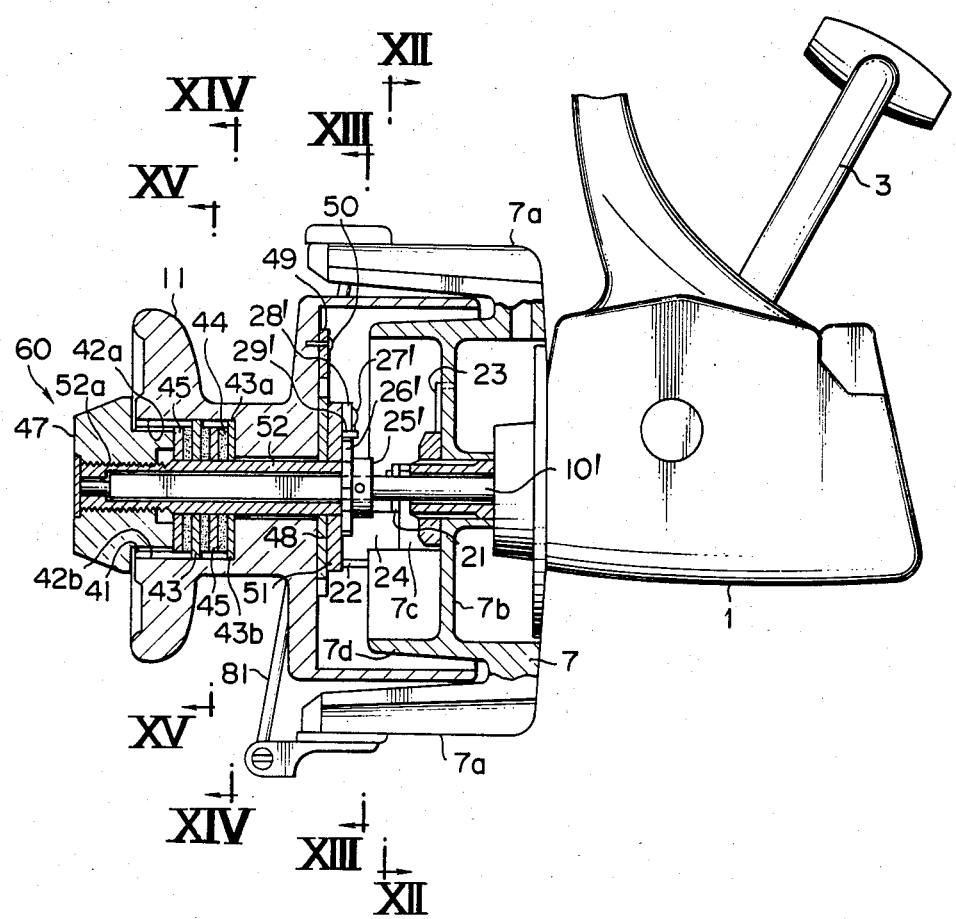
FIG. 11 is similar to FIGS. 3 and 8, and is an overall sectional view taken through a third preferred embodiment of the spinning type fishing reel of the present invention, again taken in a vertical plane including its longitudinal axis.
Figure 13:
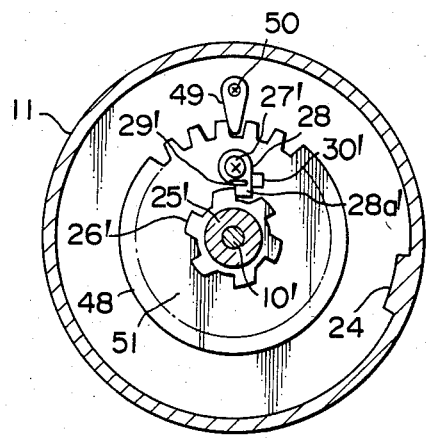
FIG. 13 is a sectional view of the third preferred embodiment construction of FIG. 11, taken in a plane shown by the arrows XIII—XIII in FIG. 11 and looking in the direction shown by those arrows.
Figure 14:
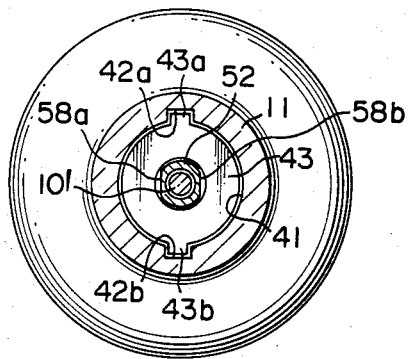
FIG. 14 is a sectional view of said third preferred embodiment taken in a plane shown in FIG. 11 by the arrows XIV—XIV and showing a view of the spool thereof with one of a set of spool side brake plates at the front of a superposed stack of brake plates.
Figure 15:
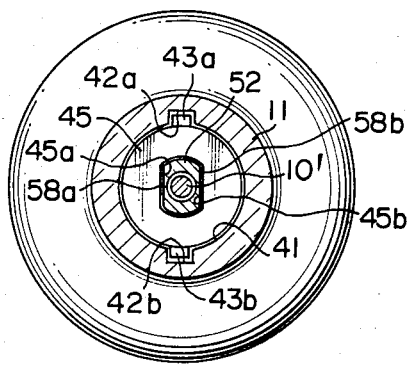
FIG. 15 is a sectional view of said third preferred embodiment taken in a plane shown in FIG. 11 by the arrows XV—XV and showing a view of said spool with one of said sleeve side brake plates at the front of said superposed stack of brake plates.

In detail, referring to FIG. 11, which is a sectional view similar to FIGS. 3 and 8 relating to the first and second preferred embodiments taken through this third preferred embodiment in a vertical plane including its longitudinal axis, in the body 1 of this spinning type fishing reel again a handle 3 is rotatably mounted via a handle shaft which communicates said rotation via a per se conventional drive mechanism similar to the type previously mentioned to a rotor 7 which is rotated and to a spool shaft 10' which is reciprocated; but no drag device such as the drag device 15 incorporated in the first and second preferred embodiments is provided at the rear of the spinning type fishing reel in this third preferred embodiment. Over the left (or front) portion in the figure of the spool shaft 10' there is fitted a sleeve member 52 the left (or front) end of which is formed with a male thread 52a, and this sleeve member 52 is so fitted to the spool shaft 10' as to be rotatable thereon but not axially slidable with respect thereto. The spool 11 is rotatably supported on the sleeve member 52. On the rear end of the sleeve member 52, just behind the rear face of the spool 11 and abutting thereagainst, there is fixedly mounted a click gear wheel 48, and just behind this click gear wheel 48 there is also fixedly mounted to the sleeve member 52 a ratchet claw support disk 51. As best seen in FIG. 13, which is a sectional view of the construction taken in a plane shown by the arrows XIII—XIII in FIG. 11 and looking in the direction also as shown by those arrows, to the rear face of the spool 11 there is rotatably fixed by a pin 50 a click claw 49 which is, by a spring not shown, biased towards the position shown in FIG. 13, i.e. towards a position in which it engages with the teeth of the click gear wheel 48.

The rotor member 7 is formed as in the case of the previous embodiments, and as before has an outer disk shaped portion 7b to which a cylindrical shell portion 7d is attached and from which two arm portions 7a project, and a mounting projection or platform 7c extending from said disk portion 7b towards the front of the spinning type fishing reel; and as before, as best shown in FIG. 4 which is a side view of said rotor 7, through this mounting platform 7c and through the body of the rotor 7 there is again rotatably fitted a twist remover switchover pin 17, which extends parallel to the central axis of the rotor 7 and of the spool shaft 10'. On the front end of this switchover pin 17, as shown in FIG. 12 which is a sectional view of the construction taken in a plane shown by the arrows XII—XII in FIG. 11 and looking in the direction shown by these arrows, there is fixedly mounted, by a split pin 20, a spool reverse claw 21, the end 21a of which is angled towards the front of the spinning type fishing reel; and on the rear end of the switchover pin 17 there is fixedly mounted a twist remover switchover control lever 18, which projects sideways from the side of the rotor 7 at its rear portion through a slot 19 formed in its previously mentioned cylindrical portion 7d, as best seen in FIG. 4 and in FIG. 7 which is a rear end view of said rotor 7.

Figure 12:
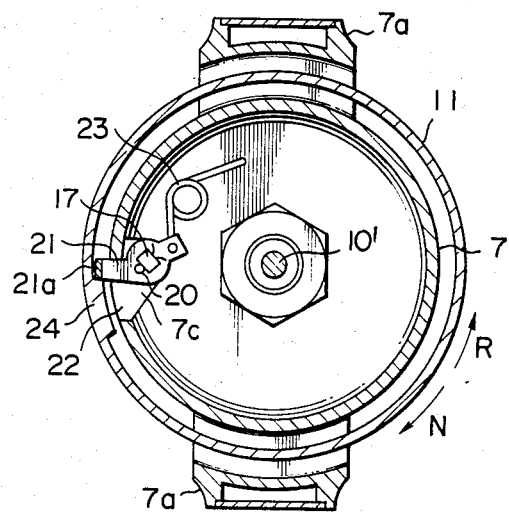
FIG. 12 is a sectional view of this third preferred embodiment construction, taken in a plane shown by the arrows XII—XII in FIG. 11 and looking in the direction shown by these arrows.

Thus, when the fisherman rotates this switchover control lever 18 by hand to its position shown in FIG. 7 by phantom lines, i.e. in the clockwise direction as seen in FIG. 7, then the spool reverse claw 21 is rotated in the anticlockwise direction from the point of view of FIG. 12, so as to be brought to its position in which its end 21a does not project through a gap 22 formed through the cylindrical portion 7d of the rotor 7; but, on the other hand, when the fisherman rotates the switchover control lever 18 by hand to its position shown in FIG. 7 by solid lines, i.e. in the anticlockwise direction as seen in FIG. 7, then the spool reverse claw 21 is rotated in the clockwise direction from the point of view of FIG. 12, so as to be brought to its position as seen in FIG. 12 in which its end 21a projects outwards through said gap 22 formed through the cylindrical portion 7d of the rotor 7. And a torsion coil spring 23 with extended engaging end portions is provided as fitted between a projecting portion of the spool reverse claw 21 and the rotor 7, so as to provide an over center biasing action or a snap action to said spool reverse claw 21, i.e. so as, when the claw 21 is in its clockwise displaced position as shown in FIG. 12, to bias it still further in the clocwise direction so as to positively hold said claw 21 in said FIG. 12 position, and so as also, when the claw 21 is in its extreme anticlockwise displaced position, to bias it still further in the anticlockwise direction so as to positively hold said claw 21 in its extreme anticlockwise displaced position. And further on the inner surface of the aforementioned rearwardly projecting cylindrical portion 11a of the spool 11 there is formed a rib like projection 24, which extends longitudinally parallel to the central axis of the spool shaft 10', and which is adapted to be engaged as shown in FIG. 12 with the end 21a of the claw 21, when said claw 21 is as explained above set to its FIG. 12 position as projecting outwards through said gap 22 through the cylindrical portion 7d of the rotor 7. This part of the construction is quite the same as in the first two preferred embodiments detailed above.

Now, the spool 11 is not directly coupled to the spool shaft 10'; however, the sleeve member 52 is coupled to the spool shaft 10' by being fixedly connected to the ratchet claw support disk 51 which is coupled to said spool shaft 10' by a ratchet mechanism which will now be described. On the spool shaft 10' there is fixedly mounted a collar 25' opposing the ratchet claw support disk 51, and between these members is sandwiched the ratchet gear 26' which also is fixedly mounted on the spool shaft 10'. As best seen in FIG. 13, on a pin 27' fixedly mounted in the rear end surface of the ratchet claw support disk 51 is rotatably mounted a ratchet claw 28' which is biased by a torsion coil spring 29' anticlockwise in FIG. 13 to engage its projecting claw portion 28a' against a stop member 30' also fixedly mounted on said rear surface of said spool 11. In this position, if it is attempted to rotate the ratchet wheel 26' in the clockwise direction with respect to the ratchet claw support disk 51, one or the other of the teeth of the ratchet wheel 26' sandwiches said claw portion 28a' between itself and said stop member 30', and this prevents the ratchet wheel 26' from further thus turning in the clockwise direction with respect to the disk 51; but, on the other hand, if it is attempted to rotate the ratchet wheel 26' in the anticlockwise direction with respect to the ratchet claw support disk 51, each of the teeth of the ratchet wheel 26' in turn pushes the claw portion 18a' and the claw 28' as a whole in the clockwise direction against the biasing action of the torsion spring 29' and is able to thus pass said claw portion 28a'. Accordingly, with reference to FIG. 13, considering the ratchet action as a whole, the ratchet claw support disk 51 cannot move with respect to the spool shaft 10' in the anticlockwise direction, but can move in the clockwise direction.

Further, the spool 11 is coupled to the sleeve member 52 and thereby to the ratchet claw support disk 51 by a drag construction 60, similar to the variable braking construction 80 explained above of the second preferred embodiment, which will now be explained. In detail, the front end of the spool 11 is formed with a cylindrical hole 41 coaxial with the spool 11, and two grooves 42a and 42b are provided as extending longitudinally along the inner surface of this cylindrical hole 41, i.e. parallel to the axis of the spool 11; this can be best seen in FIGS. 14 and 15, which are sectional views of the spool 11 taken in the planes indicated in FIG. 11 by the arrows XIV—XIV and XV—XV, respectively. Also, the end of the sleeve member 52, over which the spool 11 is fitted, protrudes into and through the cylindrical hole 41 of said spool 11, and is formed with a screw thread 52a on its very tip portion and with two flattened portions 58a and 58b on opposite sides of its portion contiguous to said tip portion which lies along the central axis of the hole 41. In the cylindrical hole 41 there are provided a number of spool side brake plates 43 and sleeve side brake plates 45 in an sandwiched together alternating arrangement, and between each contiguous pair of these there is provided a friction plate 44. Each of the spool side brake plates 43 has a circular central hole for passage of the sleeve member 52 without rotational engagement thereto and a pair of projecting ears 43a and 43b extending from opposite sides of its outer circumference which are respectively engaged in the grooves 42a and 42b of the spool 11 so as to provide rotational engagement of said spool side brake plate 43 to said spool 11—see FIG. 14, which is a sectional view of the spinning type fishing reel taken in a plane shown in FIG. 11 by the arrows XIV—XIV and showing a view of the spool 11 with one of the spool side brake plates 43 at the front of the superposed stack of brake plates. And, similarly but oppositely, each of the sleeve side brake plates 45 has a circular outer circumference for seating in the hole 41 of the spool 11 without rotational engagement thereto and a central hole for passage of the sleeve member 52 which is circular except for a pair of flats 45a and 45b on its opposite sides which are respectively engaged to the flattened portions 58a and 58b of said sleeve member 52 so as to provide rotational engagement of said sleeve side brake plate 45 to said sleeve member 52 see FIG. 15, which is a sectional view of the spinning type fishing reel taken in a plane shown in FIG. 11 by the arrows XV—XV and showing a view of the spool 11 with one of the sleeve side brake plates 45 at the front of the superposed stack of brake plates. And the friction plates 44, which are made out of a relatively soft and high friction material such as asbestos, and which are interposed between each neighboring pair of brake plates 43 and 45, are each formed with a circular central hole for passage of the sleeve member 52 without rotational engagement thereto and also with a circular outer circumference for seating in the hole 41 of the spool 11 without rotational engagement thereto.

A drag knob 47 is formed with a female screw thread which is engaged with the male screw thread 52a formed on the end of the sleeve member 52, so that, by selective adjustment of the amount of screwing of said drag knob 47 on said sleeve member 52, the amount of compression pressure applied to the superposed sandwich stack of the brake plates 43 and 45 and the friction plates 44 may be varied at will.

Again, in the operation of this third preferred embodiment, when it is desired to remove twisting of the fishing line, the user of the spinning type fishing reel moves the lever 18 to the position shown in FIG. 7 by the solid lines, and then he or she turns the handle 3 in the reverse rotational direction to that for winding up the fishing line, and this as in the case of the first and second preferred embodiments causes the rotor 7 and the spool 11 to be rotated together in the reverse direction, being as before rotationally linked together by one side of the claw 21 pressing on the rib projection 24 while the other side of said claw 21 is pressed against the edge of the gap 22, so as to trap said claw 21 between the projection 24 and said edge of the gap 22. Since in this preferred embodiment the spool 11 is coupled to the sleeve 52 via the mutual frictional effect between the brake plates 43 and 45, when the spool 11 is rotated in the reverse rotational direction as mentioned above, the sleeve member 52 is rotated together with the spool 11. Here, it should be noted that, since in this case the ratchet device including the ratchet wheel 26 and the ratchet claw 28 does not lock up, the sleeve member 52 is not engaged to the spool shaft 10' to any substantial extent, and accordingly the whole part of the drag device 60 is rotated together with the spool 11, the rotor 7, and the sleeve member 52, and consequently no braking effect is exerted by the drag device 60 on the above mentioned reverse rotation of the spool 11 and the rotor 7.

On the other hand, when a fish bites on the bait or lure attached to the end of the fishing line and pulls the line, thus applying torque to the spool 11 to rotate it in the normal rotational direction, said torque is transmitted to the sleeve member 52 via the mutual frictional effect between the brake plates 43 and 45. However, in this case, the ratchet device including the ratchet wheel 26 and the ratchet claw 28 locks up, thus connecting the sleeve member 52 to the spool shaft 10' and thereby to the body 1 with regard to the rotational movement in this rotational direction. Therefore, in this case, braking effect is exerted by the drag device 60 on the above mentioned rotation in the normal rotational direction of the spool 11; the spool 11 can be rotated in the normal rotational direction with respect to the sleeve member 52 and the body 1 only when it is applied with a torque greater than a certain threshold value. And when the spool 11 is rotated in the normal rotational direction with respect to the sleeve member 52 as mentioned above, thus the click claw 49 engages the teeth of the click gear wheel 48 fixedly mounted on the sleeve member 52 in succession and produces a clicking sound, thus alerting the user of the spinning type fishing reel to the fact that the fish is pulling strongly enough on the line to break the braking effect of the drag device 60.

In all the three preferred embodiments described above the provision of the mechanism including the twist removal switchover lever 18, etc., ensures that the user of the spinning type fishing reel can optionally select whether or not the rotor and the spool should rotate together in the reverse rotational direction to untwist the fishing line, but as an alternative it could be so arranged that at all times when the rotor is rotated in the reverse rotational direction the spool accompanies it.

In summary, the effectiveness of the present invention is attained by the fact that by turning the rotor and the spool together in the reverse rotational direction the twisting of the fishing line can be reversed and cancelled.

Although the present invention has been shown and described in terms of several preferred embodiments thereof, and with reference to the appended drawings, it should not be considered as being limited thereby. Many possible variations on the shown preferred embodiments are possible, without departing from the scope of the present invention; and likewise the presently appended drawings may contain various features which are not essential to the gist of the present invention. Accordingly, the scope of the present invention, and the protection desired to be accorded by Letters Patent, are not to be defined by any of the details of the terms of the above description, or by any particular features of the hereto appended drawings, but solely by the legitimate and proper scope of the accompanying claims, which follow.

What is claimed is:

1. A spinning type fishing reel, comprising:
   (a) a body;
   (b) a spool rotatably and reciprocally supported in said body, said spool including a cylindrical section;
   (c) a rotor rotatably supported in said body, said rotor including a cylindrical section;
   (d) driving means mounted with said body for rotating said rotor and for reciprocating said spool;
   (e) a bail arm mounted on said rotor for causing a fishing line to be wound around said spool when said rotor is rotated in a first direction;
   (f) control means shiftable between first and second positions for selectively causing said spool to be rotated in a second direction, opposite from said first direction, along with rotation of said rotor in said second direction, said first position being wherein said control means causes said spool to be rotated in said second direction along with rotation of said rotor in said second direction, and said second position being wherein said rotor may rotate in either said first direction or said second direction relative to said spool;
   (g) drag means coupled with said spool for preventing rotational movement of said spool, when a turning force of less than a determinant value is applied to said spool; and
   (h) coupling means for selectively substantially rotationally coupling said spool to said drag means only when said spool tends to rotate in said first direction.

2. A spinning type fishing reel according to claim 1, wherein said coupling means is a ratchet device.

3. A spinning type fishing reel according to claim 1, wherein said control means comprises:
   (a) a shift lever for manually shifting said control means from said second position to said first position;
   (b) a projection formed with said spool cylindrical section;
   (c) a radial edge formed in said rotor cylindrical section; and
   (d) a claw actuatable by said shift lever to engage said spool cylindrical section projection and said rotor cylindrical section radial edge to cause said spool to be rotated in said second direction along with rotation of said rotor in said second direction.

4. A spinning type fishing reel according to claim 1, further comprising adjustable braking means coupled with said spool for selectively resisting rotation of said spool relative to said body only when said spool is rotating in said second direction relative to said body.

5. A spinning type fishing reel according to claim 4, wherein said driving means includes a spool shaft rotatably mounted in said body, said spool being rotatably mounted on said spool shaft,
   wherein said drag means is coupled with said spool via said spool shaft and said coupling means,
   and wherein said adjustable braking means comprises:
   (a) a first friction plate mounted within said spool in a manner to rotate with said spool;
   (b) a second friction plate mounted within said spool in a manner to rotate with said spool shaft, and to selectively engage said first plate to oppose rotation of said spool relative to said spool shaft; and
   (c) an adjustment knob threadingly mounted to said spool shaft in a manner to permit manual adjustment of relative pressure between said first and second friction plates.

6. A spinning type fishing reel, comprising:
   (a) a body;
   (b) a spool rotatably and reciprocally supported in said body, said spool including a cylindrical section, and said spool cylindrical section having a projection formed therewith;
   (c) a rotor rotatably supported by said body, said rotor including a cylindrical section, and said rotor cylindrical section being formed with a radial edge;
   (d) driving means mounted with said body for rotating said rotor and for reciprocating said spool;
   (e) a bail arm mounted on said rotor for causing a fishing line to be wound around said spool when said rotor is rotated in a first direction;
   (f) a claw having a first side and a second side opposite said first side, said claw being mounted on said rotor in a manner to be shiftable between first and second positions, wherein
      (f1) in said first position, said claw first side engages said rotor cylindrical section radial edge and said claw second side engages said spool cylindrical section projection to cause said spool to be rotated in a second direction, opposite from said first direction, along with said rotor when said rotor is rotated in said second direction, and wherein, when said rotor is rotated in said first direction, said spool cylindrical section projection temporarily engages said claw first side to cause said claw to shift to its second position, and
      (f2) in said second position, said claw is free from engagement with said spool cylindrical section projection, and is free from engagement with said rotor cylindrical section radial edge; and
   (g) a shift lever connected to said claw for manually shifting said claw from said second position to said first position.

7. A spinning type fishing reel according to claim 6, further comprising retaining means for retaining said claw in either said first position or said second position, so long as a force of more than a predetermined value is not applied to said claw to shift said claw from either of said positions to the other of said positions.

8. A spinning type fishing reel according to claim 7, wherein said retaining means comprises a spring-actuated, over-center mechanism for biasing said claw into either said first position or said second position.

* * * * *